T. J. FEGLEY & G. O. LEOPOLD.
CHUCK.
APPLICATION FILED MAR. 4, 1907.
932,259.
Patented Aug. 24, 1909.
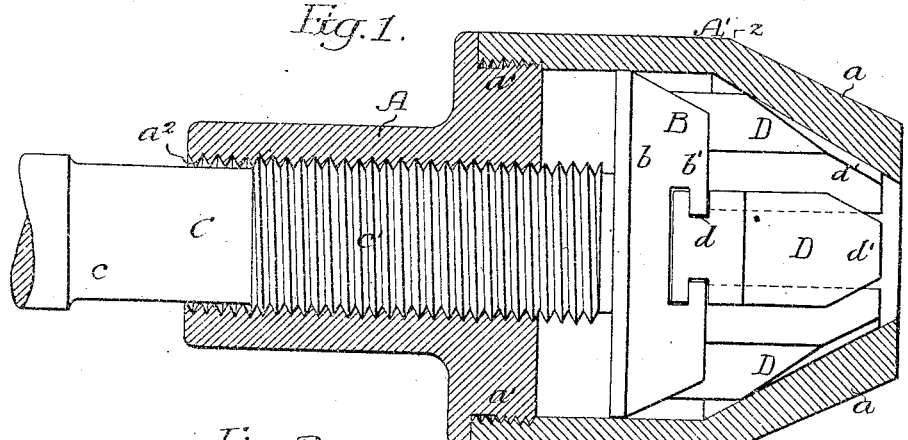
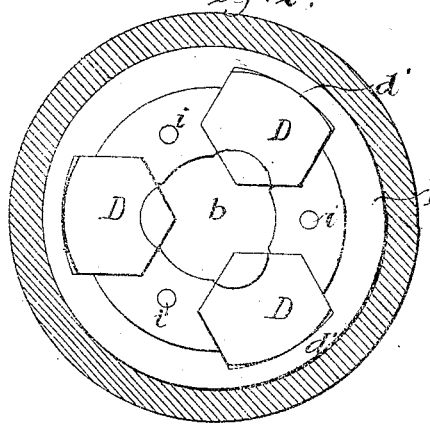
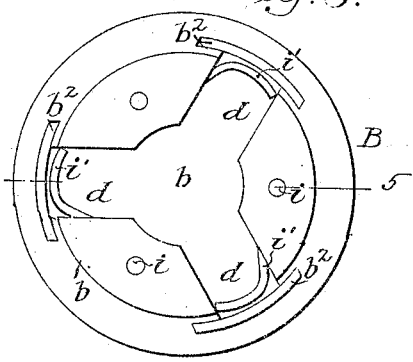
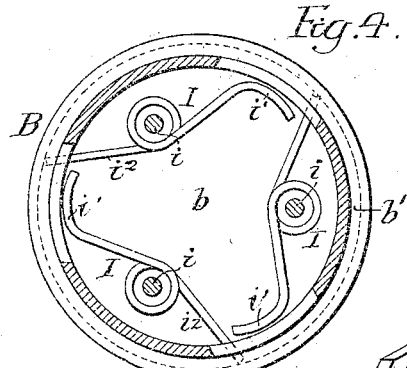
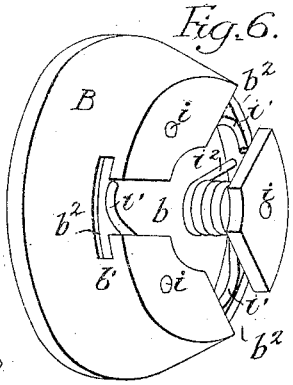
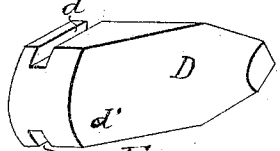
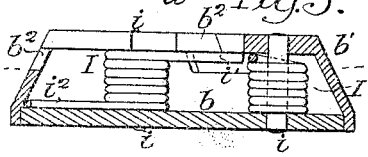
Witnesses:—
Willis A. Burrowes.
Augustus B. Cupps.
Inventors:
Thomas J. Fegley.
George O. Leopold.
by their Attorneys
Howson & Howson

UNITED STATES PATENT OFFICE.

THOMAS J. FEGLEY AND GEORGE O. LEOPOLD, OF PHILADELPHIA, PENNSYLVANIA, ASSIGNORS TO NORTH BRO'S M'F'G CO., OF PHILADELPHIA, PENNSYLVANIA, A CORPORATION OF PENNSYLVANIA.

CHUCK.

932,259.   Specification of Letters Patent.   Patented Aug. 24, 1909.

Application filed March 4, 1907. Serial No. 360,478.

*To all whom it may concern:*

Be it known that we, THOMAS J. FEGLEY and GEORGE O. LEOPOLD, citizens of the United States, residing in Philadelphia, Pennsylvania, have invented certain Improvements in Chucks, of which the following is a specification.

The object of our invention is to simplify and cheapen the construction of a chuck and to make it in such a manner that it will readily and firmly grasp the drill or other article.

In the accompanying drawing: Figure 1, is a longitudinal sectional view of our improved chuck; Fig. 2, is a sectional view of the chuck casing taken on the line 2—2, Fig. 1 and showing the jaws in elevation; Fig. 3, is a face view of the jaw-carrying disk; Fig. 4, is a sectional view through the jaw-carrying disk on the line 4—4, Fig. 5; Fig. 5, is a section on the line 5—5, Fig. 3; Fig. 6, is a perspective view of the jaw-carrying disk, and Fig. 7, is a perspective view of one of the jaws.

A is the body of the chuck, A' is a shell having a straight portion and a conical end $a$, the two parts forming the casing. The body A has a threaded portion $a'$ on to which is screwed the shell A', although the shell may be attached to the body portion in any suitable manner.

B is a disk fitting snugly within the straight portion of the shell and resting against the back of this disk is a screw threaded stem C, which is adapted to a threaded opening $a^2$ in the base of the chuck. The outer end of this stem can be shaped in any suitable manner to fit an opening in a drill spindle or other tool to which the chuck is to be applied. It will be noticed that the stem is reduced at $c$ back of the threaded portion $c'$ and the body A is elongated so as to extend over the threaded portion even when the chuck is moved out to its full extent so as to protect the screw thread $c'$.

Carried by the disk B are three jaws D, in the present instance, and one of these jaws is provided, as shown in Fig. 7, with slots $d$—$d$ at each side of the base and tapered at the back $d'$ to fit the taper of the shell.

The disk B is hollow, having a back plate $b$ and a conically flanged front plate $b'$ held together by posts or studs $i$. The front plate $b'$ has in the present instance, three radial undercut slots $b^2$ in which the jaws D are mounted.

The three posts or studs $i$ in the present instance are mounted midway between the radial slots and carry coiled springs I. One end $i^2$ of each coiled spring rests against the flange of the plate $b'$ and the other end $i'$, extends across a slot, so as to rest against the front of one of the jaws. As a result the spring tend to spread the jaws apart and force them against the conical portion of the shell A'.

By screwing the stem into the shell, the disk B will be forced by the end of the stem toward the conical portion of said shell which in turn will force the jaws toward each other against the pressure of the springs I, closing them upon the drill or other tool to be attached to the chuck. By reversing the movement of the shell the jaws will be released from pressure and the springs will force them apart.

It will be seen that the parts can be readily and cheaply constructed. By making the disk hollow and using studs upon which the springs are mounted, we are enabled to hold the springs in position even when the chuck is dismantled and, if necessary, the jaws can be removed and other jaws with a different gripping surface can be readily applied.

It will be understood that the body A and the shell A', which form the casing of the chuck, may be attached one to the other in any suitable manner, and the disk may be attached to the threaded stem C in some instances, if desired.

We claim:—

1. The combination in a chuck of a casing, a threaded stem extending through a correspondingly threaded portion of said casing, a hollow disk mounted within the casing so as to be moved by the stem and having slots, jaws mounted in said slots, springs mounted within the disk between the slots and each having one end in engagement with the jaw of one slot so as to force the same outwardly, the casing and the jaws being beveled so that when said casing is turned relatively to the stem the jaws will be moved in the slots.

2. The combination of a casing having a threaded opening, a screw threaded stem extending through the opening in the casing, the front of the casing being conical in shape, a hollow disk having radial undercut slots in the front face, studs extending from one face of the disk to the other, coiled springs mounted on each stud, one end of each coiled spring extending across the radial slot, jaws mounted in the radial slots and bearing against the springs, the said jaws being beveled at the back to correspond to the taper of the casing, substantially as described.

3. The combination of a casing made in two parts, consisting of a body portion and a shell, there being a threaded opening in the body portion, a shell having a straight portion and a conical end, a hollow disk arranged to move within the straight portion of the shell and having undercut radial slots, a stem extending through the threaded opening in the body portion and resting against the disk, springs carried within the disk at the sides of the slots and each having a portion extending into one of said slots, with jaws mounted in the slots and forced against the conical portion of the shell by said springs.

4. The combination in a chuck, of a casing having a screw threaded opening in one end and conical at the opposite end, a stem extending through the screw threaded opening, a disk mounted in the casing and bearing against the stem, said disk having undercut slots, jaws mounted in the undercut slots, the disk being made hollow and consisting of two plates, one having a flange in which the slots are cut, studs extending from one plate to the other and securing the two plates together, and coiled springs mounted on the studs, one end of each coiled spring extending across one of the radial slots, substantially as described.

5. In a carrying disk for chucks, the combination of the front plate having a conical flange, and provided with radial slots, a back plate, posts securing one plate to the other, springs on the posts, an end of each spring extending across a radial slot, substantially as described.

In testimony whereof, we have signed our names to this specification, in the presence of two subscribing witnesses.

THOMAS J. FEGLEY.
GEORGE O. LEOPOLD.

Witnesses:
Jos. H. KLEIN,
WM. A. BARR.